US008985052B1

(12) United States Patent
    Lush

(10) Patent No.: US 8,985,052 B1
(45) Date of Patent: Mar. 24, 2015

(54) BIRD FEEDER

(71) Applicant: Raymon W. Lush, Bloomfield, NE (US)

(72) Inventor: Raymon W. Lush, Bloomfield, NE (US)

(73) Assignee: Sweet Corn Products LLC, Bloomfield, NE (US)

(*) Notice: Subject to any disclaimer, the term of this patent is extended or adjusted under 35 U.S.C. 154(b) by 135 days.

(21) Appl. No.: 13/868,229

(22) Filed: Apr. 23, 2013

Related U.S. Application Data

(60) Provisional application No. 61/638,562, filed on Apr. 26, 2012.

(51) Int. Cl.
    *A01K 39/01* (2006.01)
    *A01K 39/012* (2006.01)
(52) U.S. Cl.
    CPC .................................. *A01K 39/012* (2013.01)
    USPC ........................ 119/51.01; 119/52.1
(58) Field of Classification Search
    USPC .......... 119/51.01, 52.1, 57.8, 57.9, 52.2, 52.3
    IPC ............................................. A01K 39/00,39/01
    See application file for complete search history.

(56) References Cited

U.S. PATENT DOCUMENTS

| | | | | |
|---|---|---|---|---|
| 2,634,705 | A | * | 4/1953 | Mayes .......................... 119/57.8 |
| 4,201,155 | A | * | 5/1980 | Hyde, Jr. ....................... 119/57.8 |
| 5,235,935 | A | * | 8/1993 | Edwards ....................... 119/57.8 |
| 6,199,509 | B1 | * | 3/2001 | Mostyn et al. ............. 119/51.01 |
| 7,198,004 | B1 | | 4/2007 | Lush |
| 7,302,911 | B1 | | 12/2007 | Lush |

\* cited by examiner

*Primary Examiner* — Peter M Poon
*Assistant Examiner* — Kathleen Alker
(74) *Attorney, Agent, or Firm* — Dennis L. Thomte; Thomte Patent Law Office LLC

(57) ABSTRACT

A bird feeder of the tube-type having a vertically disposed hollow body portion formed of a clear plastic material. The body portion has a plurality of inverted, truncated funnel members or baffles positioned therein in a vertically spaced-apart relationship which maintain a certain amount of feed at that level even though the main feed supply has dropped below that funnel member or baffle. The baffles direct feed to feed openings formed in the body portion.

1 Claim, 7 Drawing Sheets

BIRD FEEDER

CROSS REFERENCE TO RELATED APPLICATION

This is a Non-Provisional Application of Application Ser. No. 61/638,562, filed Apr. 26, 2012, entitled BIRD FEEDER.

BACKGROUND OF THE INVENTION

1. Field of the Invention

This invention relates to a bird feeder and more particularly to a tube-type bird feeder. In the prior art embodiment of FIGS. 1-3, the feeder body is comprised of a relatively rigid screen material or mesh material preferably comprised of metal with the wires thereof being arranged in vertical and horizontal patterns to create square or rectangular openings therein. In the prior art embodiment of FIGS. 4-5, the feeder body is comprised of a clear plastic material having feed openings formed therein. A third embodiment, which is the subject of this application, is disclosed. More particularly, the embodiment of the instant invention includes one or more inverted, truncated funnel members positioned therein in a vertically spaced-apart relationship which maintain a certain amount of feed at that level, even though the main feed supply has dropped below that funnel member.

2. Description of the Related Art

Many types of bird feeders of the tube-type have been previously provided wherein the feeder body is comprised of a relatively rigid screen material or mesh material which define rectangular or square openings not only to enable birds to cling thereto, but to permit birds to feed therefrom. As the feed level in the feeder body drops, that portion of the feeder body above the level of the feed is not useable by the birds. Many prior art bird feeders of the tube-type have been previously provided wherein the tubular feeder body has perch rods extending outwardly therefrom below one or more feed openings formed therein or where the feeder body is constructed of a metal mesh material so that the birds may cling to the feeder body and feed through the mesh openings of the feeder body. As the birds consume the feed from the feeder body, the level of feed drops below certain feed openings making those feed openings inoperable.

The bird feeder of FIGS. 1-3 received U.S. Pat. No. 7,198,004 while the bird feeder of FIGS. 4-5 received U.S. Pat. No. 7,302,911. Although both embodiments of the bird feeder of the original application, Ser. No. 11/480,604 have met with success, it has been discovered that the inverted, truncated funnel members of FIGS. 4 and 5 did not permit all the feed on the skirts 46 and 48 thereof to be delivered to the feed openings formed in the feeder body member 12'. Thus the instant invention is provided.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Three embodiments of a bird feeder of the tube-type are disclosed. In one embodiment (FIGS. 1-3), the feeder includes an elongated, hollow tubular member having upper and lower ends adapted to have bird feed placed therein. The upper end of the tubular member is open, but is selectively closed by a closure member such as a cap or cover. The tubular member is comprised of a mesh material which defines a plurality of square or rectangular feed openings formed therein. At least one, and preferably a plurality, of inverted, truncated funnel members are positioned in the tubular member above the lower end thereof which maintain a certain amount of feed at that level in the tubular member, even though the main supply of bird feed has dropped below the respective funnel member. See also U.S. Pat. No. 7,198,004.

In a second embodiment (FIGS. 4-5), the tube is constructed of a clear plastic material. See also U.S. Pat. No. 7,302,911.

In a third embodiment, which is the subject of this application, the skirts which extend downwardly and outwardly from the generally cylindrical portion of the baffle or even feed member, each have a V-shaped configuration so that the feed on the skirts will be delivered to the feed openings in the feeder body.

It is therefore a principal object of the invention to provide an improved bird feeder.

Still another object of the invention is to provide an improved bird feeder which includes a hollow tubular member which defines a plurality of feed openings formed therein and which also includes a plurality of inverted, truncated funnel members positioned in the tubular member above the lower end thereof which maintain a certain amount of feed at that level in the tubular member, even though the main supply of bird feed has dropped below the funnel member.

A further object of the invention is to provide a bird feeder of the type described above wherein birds may easily grasp food positioned between the tubular member and the inverted, truncated funnel members positioned in the tubular member.

Still another object of the invention is to provide a bird feeder including "even level" feed baffles or funnels therein in combination with a tubular body member comprised of a clear plastic material.

Yet another object of the invention is to provide an even feed member which diverts the feed thereon to feed openings formed in the body member.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
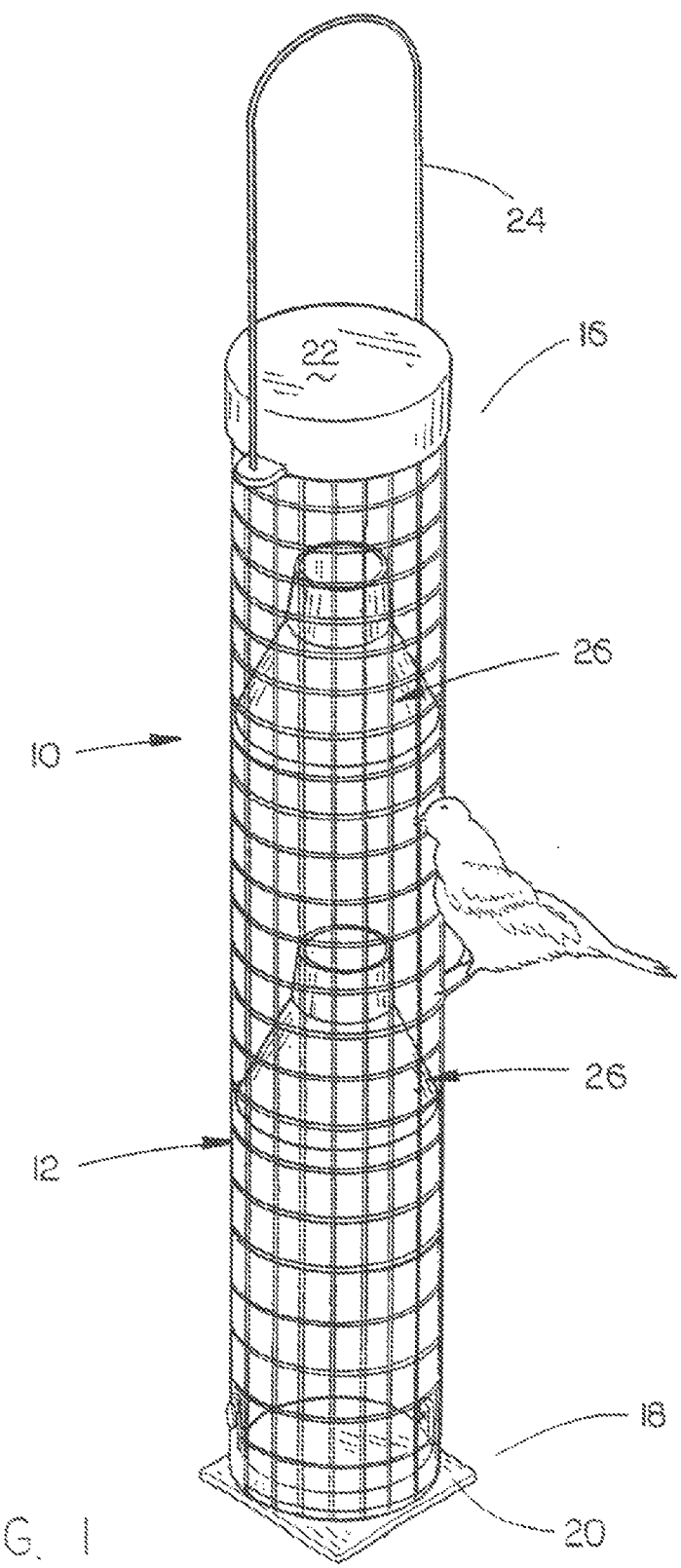
FIG. 1 is a perspective view of a prior art embodiment of a bird feeder.

The first prior art embodiment of a bird feeder (FIGS. 1-3) is referred to generally by the reference numeral 10 which includes an elongated tubular body portion or body member 12 which is comprised of a mesh material including vertically disposed and horizontally disposed wires which define square or rectangular feed openings therebetween. Bird feeder 10 is fully described in U.S. Pat. Nos. 7,198,004 and 7,302,911. Body member 12 includes an open upper end 16 and a lower end 18 which preferably has a base 20 positioned thereon so that feed within the tubular body portion 12 may fall thereon. The open upper end of the body portion 12 is preferably closed by a cap or cover 22 and has a hanger 24 connected thereto to suspend the bird feeder 10 from a branch or other support.

Figure 2:
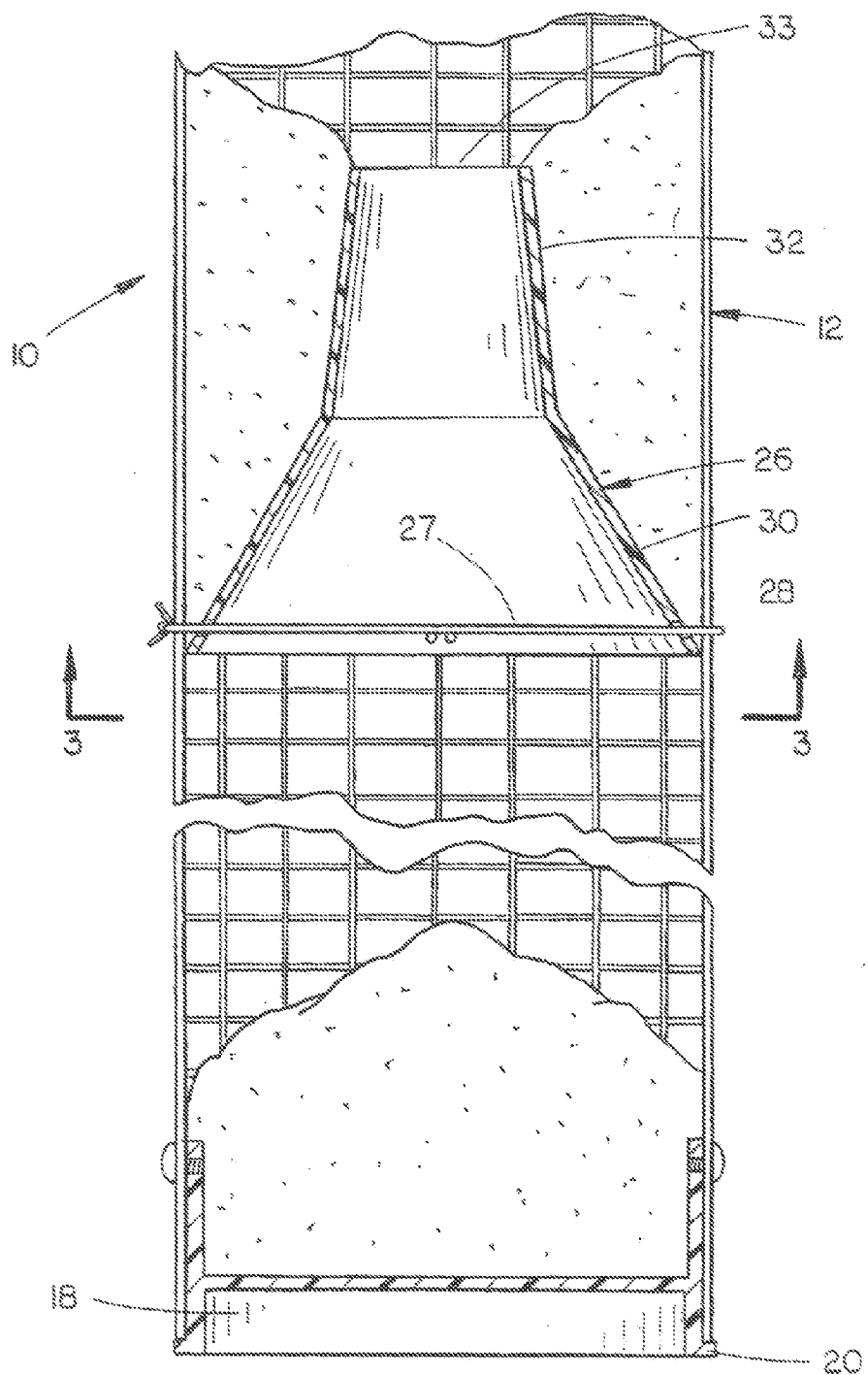
FIG. 2 is a partial sectional view of the feeder of FIG. 1 with portions thereof cut away to more fully illustrate the prior art invention.
Figure 3:
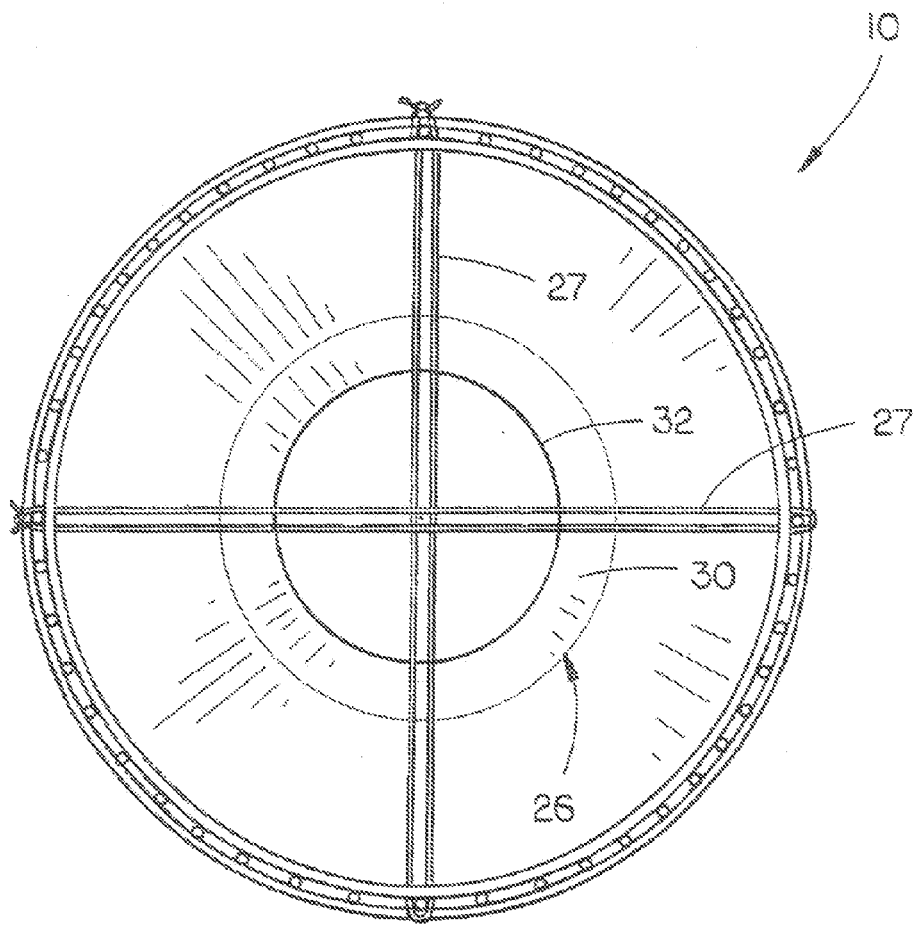
FIG. 3 is a sectional view seen on lines 3-3 of FIG. 2.

A plurality of inverted, truncated funnel-shaped members 26 are positioned in the body portion or body member 12 in a vertically spaced relationship as will now be described. The member 26 may be secured to the body member 12 by any convenient means such as by rods 27 extending through, as illustrated in FIG. 2. Each of the funnel members 26 includes a lower end 28 which is just slightly smaller than the inside diameter of the body member 12 and which has the same cross-sectional configuration. In other words, if the body member 12 is cylindrical, the lower end 28 of the funnel member 26 would also be cylindrical. If the body member 12 is rectangular or of square cross-section, the lower end 28 of the funnel members 26 would have a similar configuration so as to conform to the inside diameter of the funnel members.

Each of the funnel members 26 includes a conical-shaped portion 30 which extends upwardly and inwardly from the lower end 28 to a generally cylindrical portion 32 which extends upwardly therefrom. The upper end of cylindrical portion 32 is open at 33 so that feed may pass downwardly through the funnel member 26 as will now be described.

Assuming that there are a plurality of funnel members 26 secured to and positioned within the body ember 12, the feeder is filled as will now be described. The cap or cover 22 is removed and feed is poured into the body member 12 from the upper end thereof with the feed passing to the bottom of the body member 12 through the openings 33 in the cylindrical portions 32. As the body member 12 is filled, the areas between the conical-shaped portions 30 and the cylindrical portions 32 with respect to the body member 12 will be filled with feed.

As the feed in the body member 12 is consumed by birds, a certain amount of feed will remain between the exterior surface of the funnel members 26 and the interior surface of body member 12, as seen in FIG. 2. In other words, the inverted, truncated funnel members 26 positioned in the body member 12 maintain a certain amount of feed at that level, even though the main feed supply has dropped below that funnel member. Therefore, even though the main feed level has dropped below the funnel members 26, there will still be feed between the funnel members and the interior surface of the body member 12 so that birds may feed at various vertical levels on the bird feeder, even though the main feed supply has dropped below those funnel members.

Figure 4:
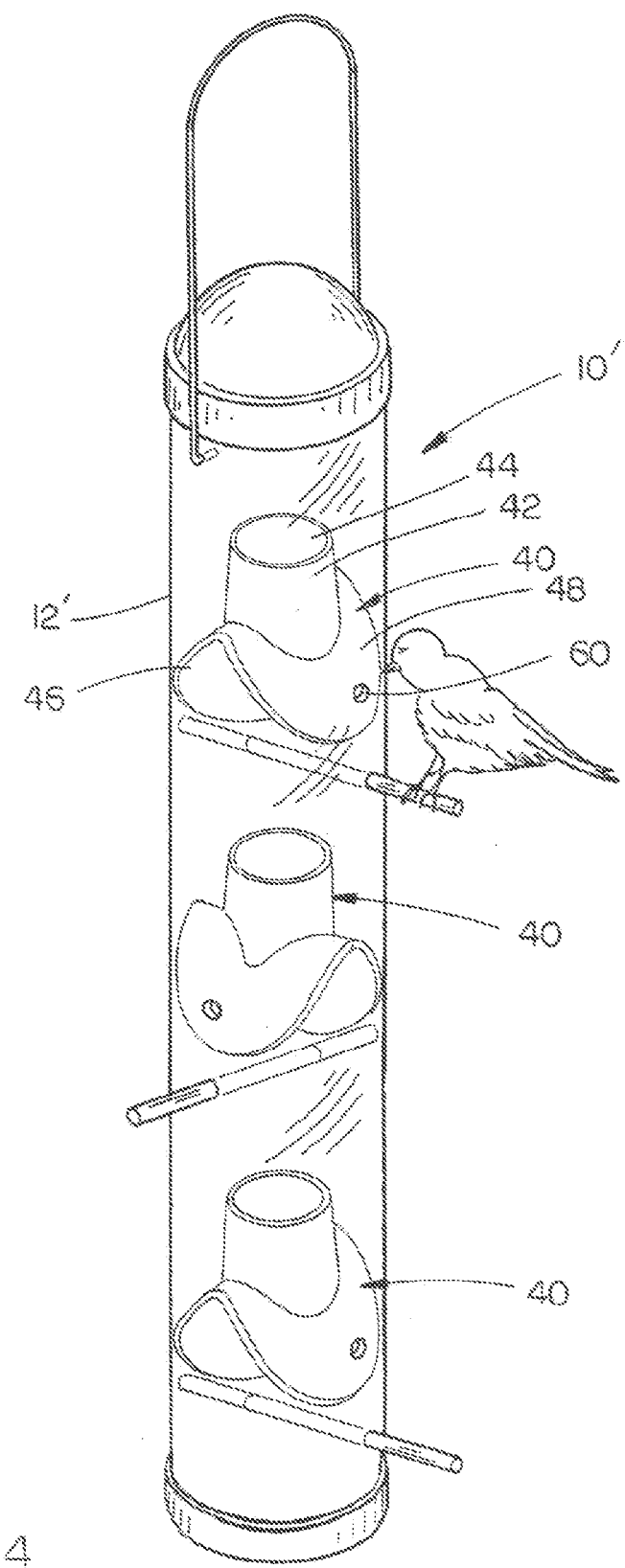
FIG. 4 is a perspective view of a prior art embodiment of a bird feeder.
Figure 5:
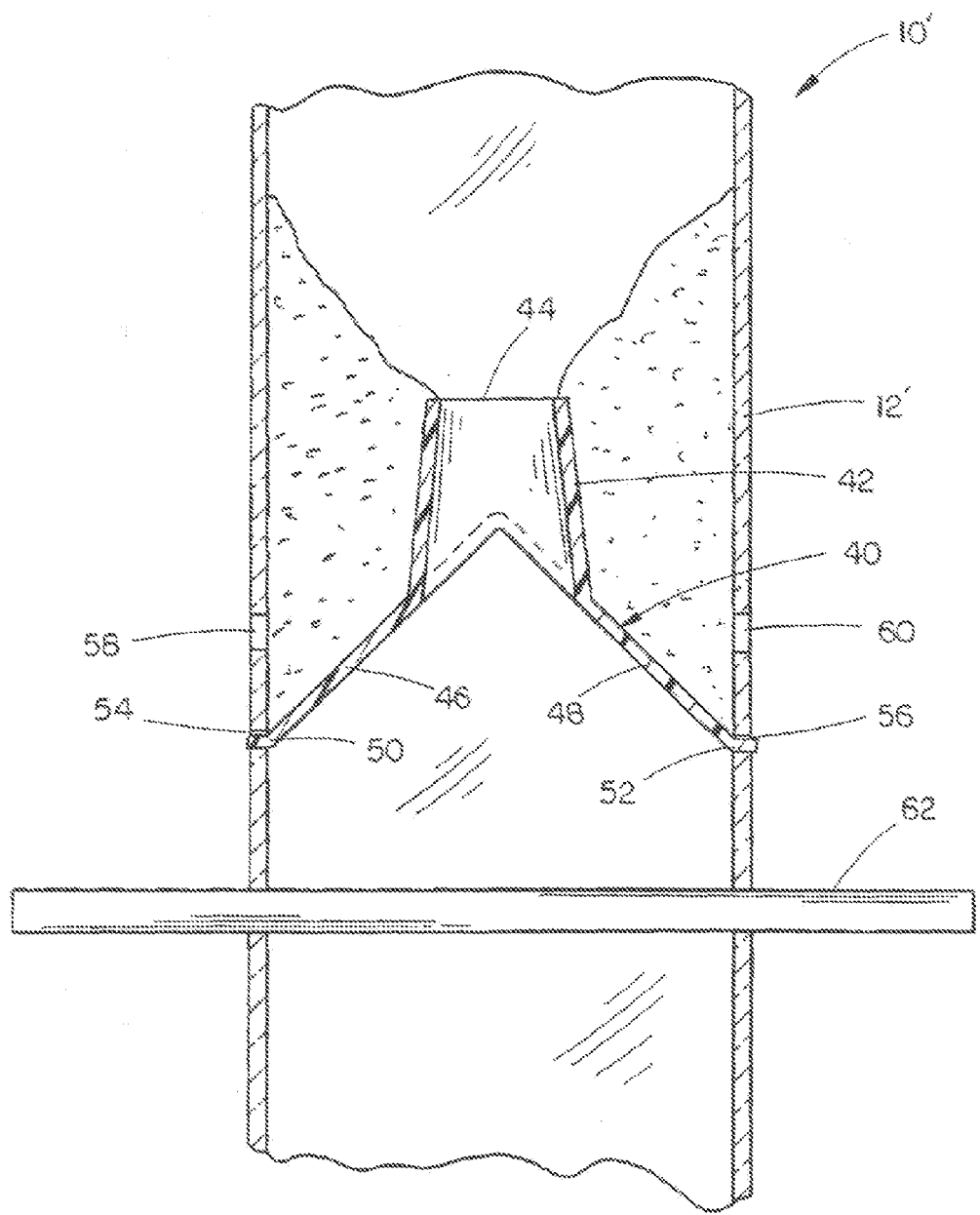
FIG. 5 is a partial sectional view of the bird feeder of FIG. 4.

In FIGS. 4 and 5, the numeral 10' refers to a prior art embodiment of a bird feeder which is fully described in U.S. Pat. Nos. 7,198,004 and 7,302,911. The primary difference between the feeder 10 and the feeder 10' is that the feeder 10' is constructed of a clear plastic material rather than the mesh material of feeder 10. A plurality of baffles or even feed members 40 are positioned within the body member 12' so as to maintain feed thereabove in the same fashion as the funnel members 26 in feeder 10. Each of the baffles 40 includes a generally cylindrical portion 42 having an opening 44 formed therein with a pair of depending skirts 46 and 48 extending downwardly and outwardly therefrom, as illustrated in FIGS. 4 and 5, which close the interior of the body member 12'. The baffles 40 are secured to the tubular body member 12' by any convenient means such as that illustrated in FIG. 5 wherein the lower ends of the skirts 46 and 48 have outwardly extending fingers 50 and 52 which are received in slots 54 and 56 which are formed in the side wall of the feeder body member 12'. Body member 12' has a pair of feed openings 58 and 60 formed therein above the lower ends of the skirts 46 and 48 to enable a bird to feed therethrough. A perch rod 62 is provided below each of the baffles 40, as illustrated in FIG. 5, to enable the birds to perch thereon while feeding through the openings 58 and 60.

The baffles 40 function in the same manner as the funnel members 26 so as to maintain a certain level of feed thereabove, as illustrated in FIG. 5, even though the main level of feed has dropped therebelow so that all of the feeding stations may be utilized.

Figure 6:
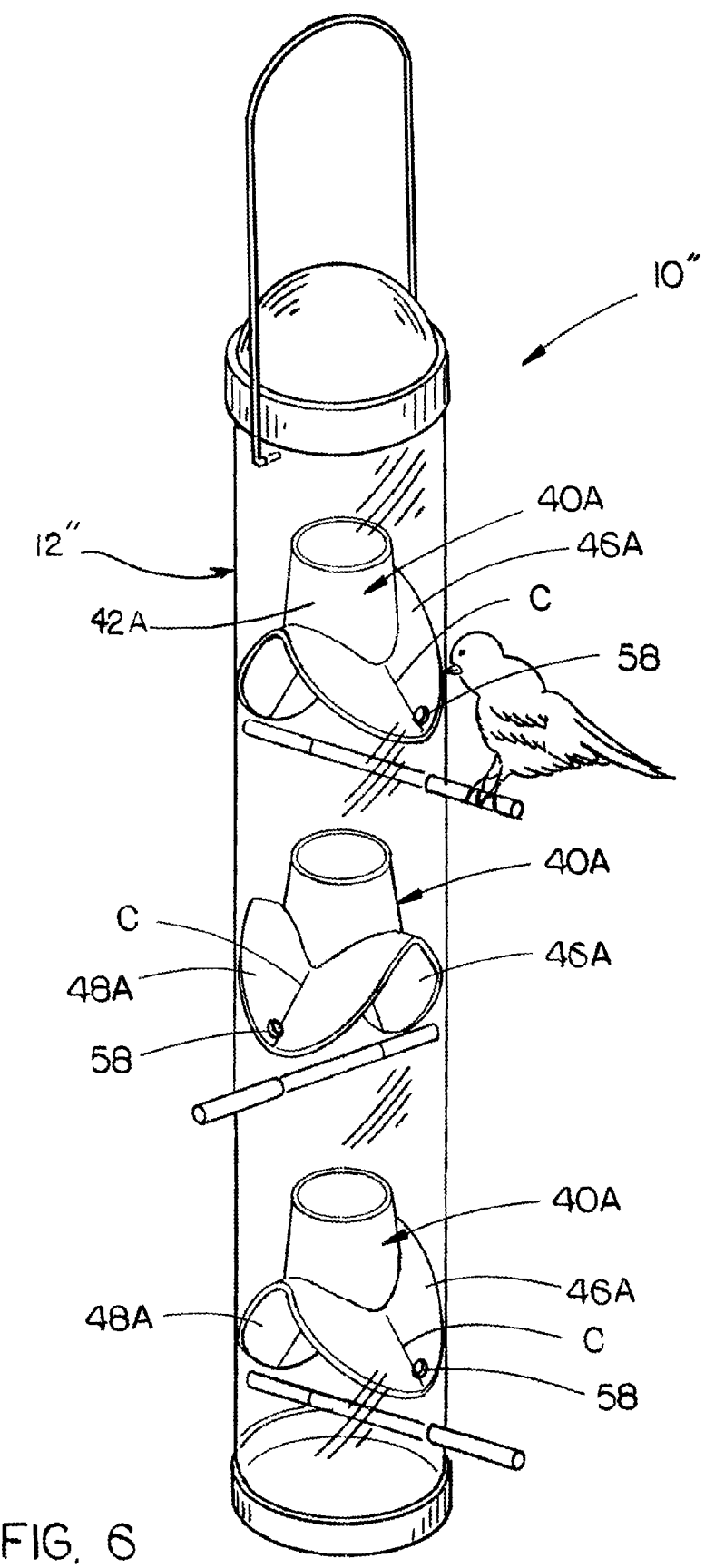
FIG. 6 is a perspective view of the bird feeder of this invention.
Figure 7:
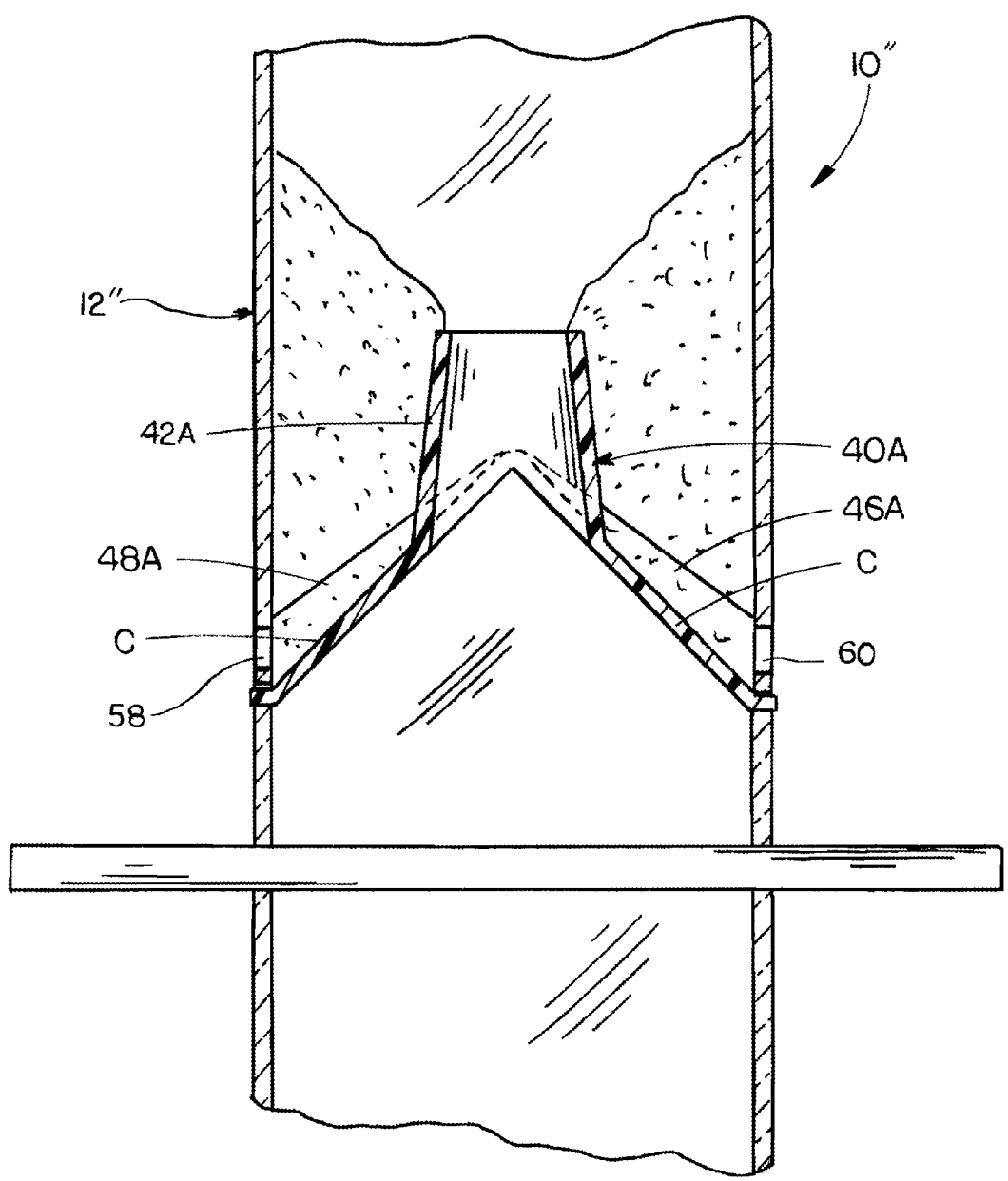
FIG. 7 is a partial sectional view of the bird feeder of FIG. 6.

FIG. 6 illustrates the feed feeder of this invention which is an improvement over the bird feeder of FIGS. 4 and 5. The primary difference between the bird feeder 10' of FIGS. 4 and 5 and the bird feeder 10" of FIGS. 6 and 7 is that the baffles or even feed members 40A have different skirts 46A and 48A which have a different configuration than the skirts 46 and 48 of even feed members 40. In FIGS. 6 and 7, the skirts 46A and 48A are also V-shaped with a center crease "C" which directs the feed material to the feed openings 58 and 60 so that all the feed on the skirts is directed to the feed openings. The bird feeder 10" includes a body member 12" which is constructed of a clear plastic material. Body member 12" has an upper end which is selectively closed by a cap or cover, as seen in FIG. 6. Each of the baffle members 40A includes a hollow generally cylindrical portion 42A which extends upwardly and inwardly from the skirt portions 46A and 48A.

It can therefore be seen that the bird feeder of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A bird feeder, comprising:
   an elongated, hollow tubular member having a closed lower end, an upper end and an inside surface adapted to have bird feed placed therein;
   said tubular member being comprised of a transparent plastic material;
   said tubular member having a first row of vertically spaced-apart feed openings formed therein;

said tubular member having a second row of vertically spaced-apart feed openings formed therein which are spaced from said feed openings in said first row of feed openings;

said feed openings in said second row of feed openings being horizontally offset from said feed openings in said first row of feed openings but dwelling in the same vertical plane as said feed openings in said first row of feed openings;

a plurality of vertically spaced baffle members positioned in said tubular member above said lower end thereof which maintain a certain amount of feed at that level in said tubular member even though the main supply of bird feed has dropped therebelow;

each of said baffle members including a generally V-shaped skirt having first and second skirt portions with upper and lower ends;

said first and second skirt portions of each of said baffle members being positioned closely to said inside surface of said tubular member;

each of said first and second skirt portions of said V-shaped skirt of each of said baffle members also being V-shaped;

said first skirt portion of said V-shaped skirt of each of said baffle members having a first elongated crease, with upper and lower ends, formed therein;

said lower ends of said first elongated creases in said first skirt portions of said V-shaped skirt in each of said baffle members being positioned adjacent a feed opening in said first row of feed openings to direct feed towards that feed opening;

said second skirt portion of said V-shaped skirt of each of said baffle members having a second elongated crease, with upper and lower ends, formed therein;

said lower ends of said second elongated creases in said second skirt portions of said V-shaped skirt in each of said baffle members being positioned adjacent a feed opening in said second row of feed openings to direct feed towards that feed opening.

\* \* \* \* \*